United States Patent

Hall

[11] 4,063,633
[45] Dec. 20, 1977

[54] VACUUM PLUG FEED MACHINE

[75] Inventor: Floyd Vanmeda Hall, Durham, N.C.

[73] Assignee: Liggett Group Inc., Durham, N.C.

[21] Appl. No.: 740,655

[22] Filed: Nov. 10, 1976

[51] Int. Cl.² .............................................. B65G 47/12
[52] U.S. Cl. .................................... 198/455; 198/533; 198/543
[58] Field of Search ...................... 221/211; 214/1 BS; 198/689, 455, 533, 622, 624, 540, 543, 550, 560, 562

[56] References Cited

U.S. PATENT DOCUMENTS

| 2,785,683 | 3/1957 | Davidson | 198/622 X |
| 3,094,128 | 6/1963 | Dearsley | 214/1 BS X |
| 3,307,723 | 3/1967 | Walker et al. | 53/126 X |
| 3,311,008 | 3/1967 | Schubert | 198/455 X |
| 3,365,857 | 1/1968 | Liedtke | 198/422 X |
| 3,579,953 | 5/1971 | Gianese | 198/422 X |
| 3,715,056 | 2/1973 | Preston | 221/211 |
| 3,789,575 | 2/1974 | Bross | 221/211 X |

*Primary Examiner*—Evon C. Blunk
*Assistant Examiner*—James L. Rowland
*Attorney, Agent, or Firm*—J. Bowen Ross, Jr.; Michael L. Hendershot

[57] ABSTRACT

An apparatus for the high speed transportation of cigarette filter rods from a magazine containing the rods to a transfer drum. The apparatus has a magazine, a downwardly extended chute connected to the magazine adapted to receive filter rods singularly, a rod separation means at the junction of the magazine and chute, and a vacuum means adjacent to the chute exit. The vacuum means creates a negative pressure within the chute to hold the lowermost rod in the chute in a fixed position for accurate transfer to the transfer drum.

7 Claims, 2 Drawing Figures

VACUUM PLUG FEED MACHINE

BACKGROUND OF THE INVENTION

The present invention relates to apparatus and method for transporting cigarette filter rods. More particularly, the invention relates to improvements in the transfer apparatus used to transfer cigarette filter rods from a magazine to a transport drum.

Cigarette filter rods are frequently made in the shape of long cylinders or rods transported in bulk quantities, and then separated and delivered in a particular spatial orientation and in a particular sequence. Usually, the filter rods are delivered in bulk to a magazine from which the filter rods must be fed singularly to a transfer drum in sequential order for further processing.

Generally, there are several ways to transfer the filter rods out of the magazine. One way is to have a gravity feed chute transport the filter rods to a transfer drum having a fluted surface to accept and transport the cigarette filter rods. However, several problems arise when this technique is used. The filter rods tend to clump in the magazine and block the entrance to the gravity feed chute. This blockage prevents the flow of single cigarette filter rods into the transfer drum. In a high speed filter rod production operation, blockage at the feed slot preventing emptying of the magazine is extremely undesirable. With a high speed production rate of thousands of filter rods a minute, several minutes delay to clean up a blockage means the loss of a relatively large number of filter rods.

Further, the filter rods have not always been accurately positioned for transfer to the transfer drum. That is, in some instances, the filter rod which is to be transferred has sometimes been askew relative to the transfer drum. Thus, when being transferred, the filter rod can be damaged, misaligned, or jammed relative to the transfer drum.

In order to overcome some of these problems, it has been known to use a vacuum assisted fluted transport drum, as described in U.S. Pat. No. 3,901,373. In this case, a fluted transport drum which is provided with apertures through which a vacuum is drawn is used to pick up cigarette filter rods. During use, the vacuum drawn holds the cigarette filter rods in place during transport. However, such vacuum assisted transport drums only hold the filter rod in place after loading but do not assist in the transfer of the filter rods from the magazine.

Accordingly, it is an object of the invention to provide an apparatus for high speed accurate transfer of cigarette filter rods from a magazine to a transport drum.

A further object of the invention is to provide an apparatus for the singular high speed transfer of cigarette filter rods from a magazine through a downwardly extended chute to a transfer drum.

A further object of the invention is to transfer cigarette filter rods from a magazine to a transfer drum in a simple efficient high speed manner.

A further object of the invention is to provide an apparatus for the high speed transfer of cigarette filter rods which requires a minimum of maintenance.

SUMMARY OF THE INVENTION

Briefly the invention provides an apparatus and method for the high speed transportation and sequential delivery of cigarette filter rods from a magazine holding the rods to a transfer drum to receive the rods.

The apparatus includes a chute which extends downwardly from a magazine holding a supply of cigarette filter rods and which is dimensioned to receive the rods singularly from the magazne. In addition, a rod separator means is positioned at a junction of the chute with the magazine. This rod separator means functions to provide a continued flow of filter rods from the magazine into the chute. Also, a vacuum means is positioned adjacent to an exit of the chute to singularly receive the rods from the chute. The vacuum means draws suction and exerts a downward force on the filter rods in the chute. A rotary rod transfer means is located adjacent the vacuum means to remove the rods sequentially from the vacuum means in preselected spaced-apart sequence to a transfer drum.

During use, the vacuum means draws the lowermost filter rod in the chute into a precise positive position so that the rod can be transferred via the transfer means to the transfer drum. Further, as the lowermost rod is transferred, the suction created in the chute pulls the remaining rods in the chute downwardly and, in particular, accelerates the next-to-be received rod into the transfer position.

The method of the invention includes the steps of singularly feeding cigarette filter rods or the like from a magazine to a downwardly extending chute, of applying a vacuum at an exit of the chute to fixedly position the lowermost rod in the chute at a given position, i.e. a transfer position; and of transferring the rods from the given position in a pre-selected spaced-apart sequence for delivery to a transfer drum.

DESCRIPTION OF THE INVENTION

Figure 1:
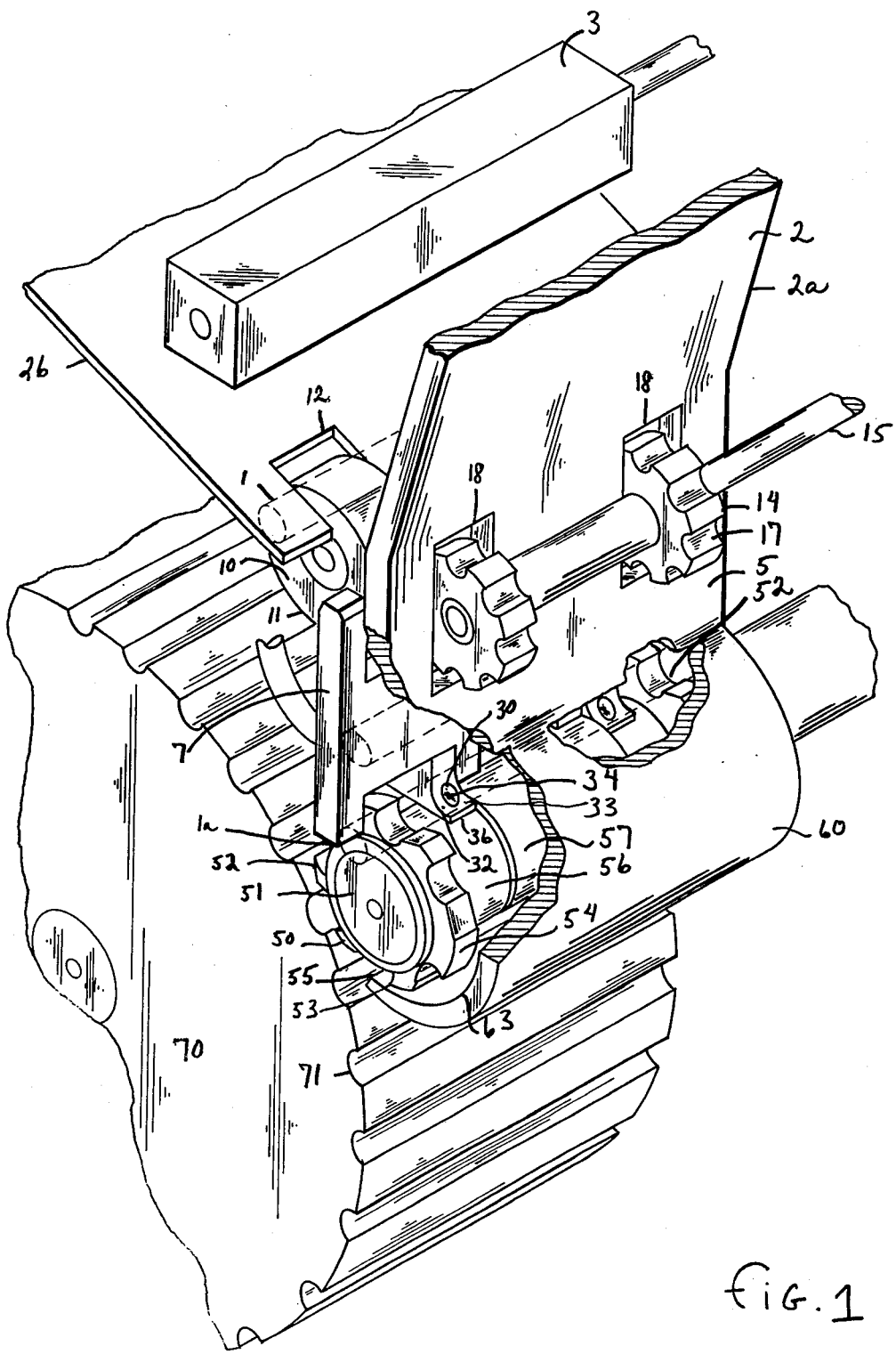
FIG. 1 illustrates a perspective view of an apparatus according to the invention.
Figure 2:
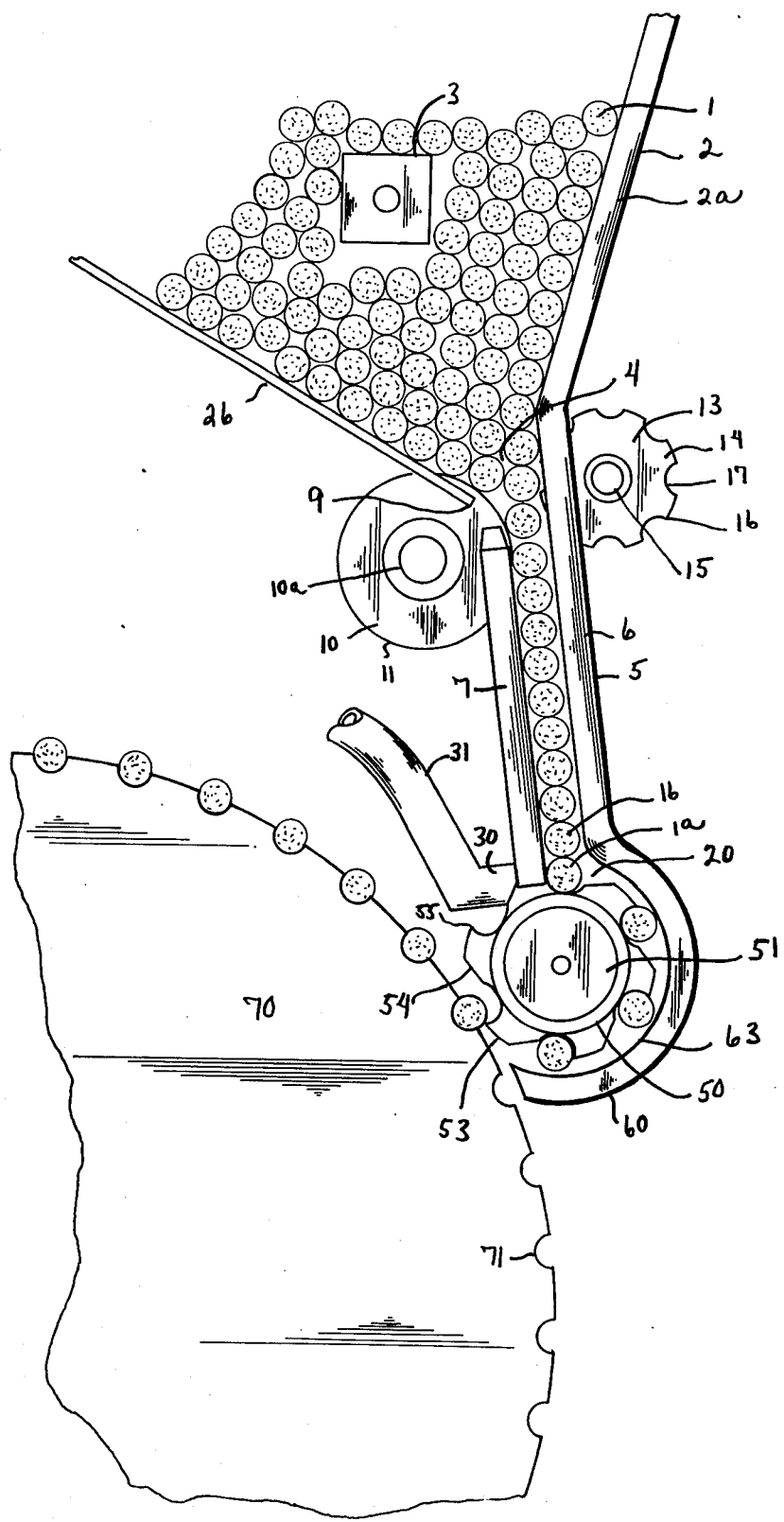
FIG. 2 illustrates a transverse elevational view of the apparatus of FIG. 1

Referring to FIG. 1, the apparatus which is used for the high speed transportation of cigarette filter rods 1 or the like includes a magazine 2 containing a supply of cigarette filter rods 1. As shown in FIG. 2 the filter rods 1 are held in the magazine 2 with their axial axes aligned. The magazine 2 comprises, inter alia, two planar walls 2a, 2b which are arranged in a V shape, with the walls being widely separated at the top and narrowly separated at the bottom so as to form a throat 4 through which the rods 1 can pass in single file. An agitator 3 is disposed within the magazine 2 and is mounted to rotate or oscillate within the magazine above the throat 4 in order to breakup clumps of rods 1 which may form in the magazine 2.

Referring to FIG. 2, the apparatus also includes a chute 5 which extends downwardly from the throat 4 of the magazine 2. This chute 5 is slightly inclined and includes a pair of parallel planar walls 6, 7 which are spaced apart a distance slightly more than a diameter of a rod 1 so as to receive the rod 1 in singular manner. As shown, the chute wall 6 is a continuation of the magazine wall 2a while the chute wall 7 extends from a point below the magazine wall 2b.

A rod separator means is positioned at junction 9 of the chute 5 with the magazine 2. This means includes a roller 10 which consists of at least one cylinder mounted on an axle 10a which is disposed parallel to the rods 1 contained in the magazine 2 and is positioned outside of the magazine 2. The outer circumferential surface 11 of the roller 10 protrudes through a slot 12 (see FIG. 1) in the wall 2b and comes in contact with the rods 1 in the throat 4 of the magazine 2. The axle 10a is connected to a conventional drive means (not shown) which rotates roller 10. As viewed, the roller 10 rotates in a clockwise direction with the speed of the circumferential surface 11 sufficient to provide a continued flow of rods 1 down the chute 5.

The rod separator means also includes a bumping means oppositely disposed from the roller 10. This bumping means 13 comprises a pair of fluted rollers 14 mounted on an axle 15 which is positioned outside of the magazine 2 and is disposed parallel to the axial axis of the roller 10. The axle 15 is connected to a conventional drive means (not shown) to be driven in a clockwise direction as viewed. As shown, the circumferential surface 16 of each roller 14 contains semi-circular flutes 17 which are parallel to the axle 15. The circumferential surface 16 of the rollers 14 extend into the chute 5 through slots 18 in the chute wall 6. As these rollers 14 rotate, the rods 1 falling into the flutes 17 are bumped away from the chute 5. This action by the bumping means 13 prevents clogging of the throat 4.

The action of the rollers 10, 14 effectively prevents the rods 1 from jamming in the throat 4. The rotation of the roller 10 moves the rods 1 positioned along magazine wall 2b into the chute 5 while the rollers 14 cause the rods 1 moving downward along the magazine wall 2a to be jogged upwards. This combined action insures that only one rod would be fed into the chute 5 at a time.

A vacuum means 30 is positioned adjacent to an exit 20 of the chute 5 and includes a suction pipe 31 which is connected to a suitable vacuum source (not shown) and a pair of air intake tubes 32. Each intake tube 32 has an arcuate surface 33 at the end which corresponds to the outer circumferential surface of a rod 1 and a flat surface 36 forming the bottom of the intake tube 32. Each arcuate surface 33 has an aperture 34 which communicates with the pipe 31 to draw in a stream of air from the chute 5. This drawing in of air at the chute exit 20 creates a nagative pressure inside the chute 5.

As viewed, the arcuate surfaces 33 are aligned in the plane of the chute 5 and are spaced across the chute 5 to receive and locate the lowermost rod 1 in a given transfer position. To this end, the chute wall 7 is slotted at the lower end to permit projection of the tubes 32 into the chute 5.

A rotary rod transfer means 50 is also located at the chute exit 20. This rotary rod transfer means 50 has an elongated axle 51 and sprockets 52 mounted in axial alignment on the axle 51. The axle 51 has a circumferential surface 57 which is provided with recessed grooves 56 adjacent each tube 32 of the vacuum means 30. As shown in FIG. 1, the ends of the air intake tubes 32 are positioned in the grooves 56 immediately beneath the chute 5. The grooves 56 are recessed to accomodate the intake ends 32 in such a manner that the rods 1 are evenly supported and held on the intake end surfaces 33 under a vacuum force. The vacuum means 30 creates a vacuum, e.g., of 2.1 inches of mercury with all apertures 34 open, 2.2 inches of mercury with one aperture 34 open and 2.3 inches of mercury with all apertures 34 blocked by a rod 1.

The sprockets 52 each have radially protruding and circumferentially spaced-apart forwardly extending teeth 53. These teeth 53 each have a shaped outer surface 54 and a concave inner surface 55. The inner surface 55 acts as a groove to receive and hold a rod 1 while the outer surface 54 is shaped to allow a tooth 53 to move past a rod 1 located on the tubes 32 without interfering with the positioning of a rod 1 on the tubes 32.

A curvilinear retaining wall or shroud 60 is formed as a continuation of the chute wall 6 to surround the transfer means 50 to retain the rods 1 in the grooves 55.

A transfer drum 70 is located adjacent to the end of the shroud 60 and adjacent to the transfer means 50. The transfer drum 70 has an axis parallel to the axle 51 and has a plurality of circumferentially spaced apart grooves 71 to accomodate the rods 1 in a one-by-one sequence from the rotary transfer means 50.

The transfer drum 70 rotates in a counter clockwise direction, as viewed, at a rate to register the grooves 71 with the grooves 55. The rotation of the transfer drum 70 is registered with the rotary transfer means 50 and allows a transfer of rods 1 from the transfer means 50 at a high speed.

In operation, a supply of filter rods 1 are loaded into the magazine 2 with their axial axes parallel. During this time the agitator 3 oscillates to break up any clumps of rods near the throat 4 of the magazine 2. As the rods 1 approach the throat 4, the roller 10 rotates successive rods 1 into the chute 5. At the same time the bumping means 13 rotates to prevent the rods 1 from bridging over the chute 5. As the rods 1 move into the chute 5, the lowermost rod 1a is drawn downwardly under gravity and the suction force created by the vacuum means 30. This lowermost rod is then pulled into the tubes 32 over the apertures 34 so as to be held in a fixed positive transfer position by the suction. Next, the rotating transfer means 50 picks up the rod 1a on the tubes 32 and carries the rod forwardly under the shroud 60 to the transfer drum 70. When the rod 1a has been moved off the tubes 32, the unblocked apertures 34 suddenly starts to draw more air. This sudden suction accelerates the next-to-be-received rod 1b downward at a rate faster than gravity. The suction also accelerates the remaining rods in the chute 5. Because of the rotation of the sprocket 52 and the outer surface 54 of the teeth 53, the lowermost rod 1a is only held on the tubes 32 for a brief moment before the rod is transferred.

This invention thus provides an apparatus in which filter rods can be consecutively positioned in a positively fixed and aligned (i.e. non-skewed) manner for transfer from a chute to a rotary rod transfer means.

Further, the invention provides an apparatus which is capable of high speed operation, e.g. at cigarette production speeds of 3600 per minute. Also, the vacuum means of the invention can be easily adapted to existing machines and requires a minimum of maintenance while decreasing the down time of the machines.

What is claimed is:

1. The combination comprising:
   a magazine for a supply of cylindrical rods;
   a chute extending downwardly from said magazine, said chute having spaced apart walls to define a flow path for a single row of cylindrical rods;
   a rod separator means positioned at the junction of said chute with said magazine for delivering a continued flow of cylindrical rods from said magazine into said chute;
   said rod separation means including a cylindrical roller having an axle providing rotation therefor and a circumferential surface, said axle being positioned outside said magazine and said chute parallel to cylindrical rods in said magazine; each of said magazine and said chute having a slot in a respective wall thereof to accommodate said roller, said roller circumferential surface protruding through said slots to contact the cylindrical rods and a cylindrically shaped bumping means opposite said roller having a fluted circumferential surface and axle providing rotation therefor, said latter axle being mounted outside said chute in parallel with said roller and said chute having a slot to accommodate said bumping means, said fluted circumferential surface protruding through said slot into said chute, said cylindrical roller and said cylindrically shaped bumping means rotating in the same direction with the peripheral surface of said cylndrical roller moving in the direction of flow and faster than said rods and with the peripheral surface of said cylindrically shaped bumping means moving in the direction against the flow of said rods and bumping thereagainst;

a vacuum means adjacent an exit of said chute for receiving said rods from said chute singularly, said vacuum means exerting a downward force on the lower most filter rods contained in said chute; and a rod transfer means for removing said rods from said vacuum means in preselected spaced-apart sequences.

2. The combination as set forth in claim 1 wherein said rods are filter rods.

3. The combination as set forth in claim 1 wherein said vacuum means comprises:

a plurality of air intake tubes connected to a vacuum source, said air intake tubes having ends with apertures to receive a lowermost filter rod in said chute.

4. The combination as set forth in claim 3 wherein said rotary rod transfer means has a plurality of sprockets disposed to pass adjacent said tubes to remove a filter rod from said tubes.

5. In an apparatus for feeding cylindrical rods, the combination comprising:

a magazine for containing a supply of cylindrical rods;

a cylindrical rod agitator mounted in said magazine and in contact with said cylindrical rods;

a chute extending downwardly from said magazine, said chute having spaced apart walls to define a flow path for a single row of cylindrical rods;

a rod separator means positioned at the junction of said chute with said magazine for delivering a continued flow of cylindrical rods from said magazine into said chute; said rod separation means including a cylindrical roller having an axle providing rotation therefor and a circumferential surface, said axle being positioned outside said magazine and said chute parallel to cylindrical rods in said magazine; each of said magazine and said chute having a slot in a respective wall thereof to accommodate said roller, said roller circumferential surface protruding through said slots to contact the cylindrical rods and a cylindrically shaped bumping means opposite said roller having a fluted circumferential surface and axle providing rotation therefor, said latter axle being mounted outside said chute in parallel with said roller and said chute having a slot to accommodate said bumping means, said fluted circumferential surface protruding through said slot into said chute, said cylindrical roller and said cylindrically shaped bumping means rotating in the same direction with the peripheral surface of said cylindrical roller moving in the direction of flow and faster than said rods and with the peripheral surface of said cylindrically shaped bumping means moving in the direction against the flow of said rods and bumping thereagainst;

a vacuum means adjacent an exit of said chute for receiving said rods from said chute singularly, said vacuum means exerting a downward force on the lower most filter rod contained in said chute; and a rotary rod transfer means for removing said rods from said vacuum means in preselected spaced-apart sequences, said rotary rod transfer means having an elongated axle and sprockets mounted in axial alignment on each end of said axle; said sprockets having radially protruding and circumferentially spaced-apart forwardly extending teeth having a convex outer surface and a concave inner surface, said inner surface adapted to receive filter rods.

6. The claim of claim 5 wherein said cylindrical rods are cigarette filter rods.

7. The apparatus of claim 6 wherein said vacuum means comprises a plurality of air intake tubes for connection to a vacuum source; said air intake tubes having ends with apertures projecting into said chute to receive a filter rod therein.

* * * * *